(12) United States Patent
Kuang

(10) Patent No.: US 11,413,126 B2
(45) Date of Patent: *Aug. 16, 2022

(54) BRUSHHEAD FOR POWER TOOTHBRUSH

(71) Applicant: Juan-Yun Kuang, Shenzhen (CN)

(72) Inventor: Juan-Yun Kuang, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/363,382

(22) Filed: Jun. 30, 2021

(65) Prior Publication Data

US 2022/0039931 A1 Feb. 10, 2022

(30) Foreign Application Priority Data

Aug. 7, 2020 (CN) .......................... 202021631331.2
Apr. 16, 2021 (CN) .......................... 202120794447.6

(51) Int. Cl.
*A61C 17/34* (2006.01)
*A61C 17/02* (2006.01)
*A61C 17/22* (2006.01)

(52) U.S. Cl.
CPC ...... *A61C 17/3481* (2013.01); *A61C 17/0202* (2013.01); *A61C 17/222* (2013.01)

(58) Field of Classification Search
CPC ..... A61C 17/22; A61C 17/222; A61C 17/225; A61C 17/32; A61C 17/34; A61C 17/3409;

(Continued)

(56) References Cited

U.S. PATENT DOCUMENTS 3,256,031 A * 6/1966 Fillweber .............. A61C 17/32
403/326
3,851,984 A * 12/1974 Crippa .................. A61C 17/02
403/322.4

(Continued)

FOREIGN PATENT DOCUMENTS

CN         1882291 A    12/2006
CN       101902986 A    12/2010

(Continued)

OTHER PUBLICATIONS

International Search Report dated Nov. 12, 2021 for International Application No. PCT/CN2021/111352 which is the family application of the instant application.

(Continued)

*Primary Examiner* — Shay Karls
(74) *Attorney, Agent, or Firm* — ScienBiziP, P.C.

(57) ABSTRACT

The present disclosure provides a brushhead for an power toothbrush detachably attached to a handle of the power toothbrush, the handle including a vibrating drive shaft, the brushhead comprising: a main body defining a receiving cavity which is configured to receive at least a portion of the vibrating driving shaft, the main body including a cavity wall substantially surrounding the receiving cavity and an end connected to the handle, with an opening which is defined in the end of the main body in air communication with the receiving cavity, so that the vibrating driving shaft is capable of being inserted into the receiving cavity through (Continued)

the opening; and an engaging assembly mounted in a side wall of the main body, the engaging assembly comprising an elastic member, which is made by metal material; wherein, a recess is defined in the outer surface of the side wall, the elastic member is deformably received in the recess, the elastic member is elastically deformed by force provided from the vibrating drive shaft when the brushhead is attached to the handle of the power toothbrush.

11 Claims, 19 Drawing Sheets

(58) Field of Classification Search
CPC ............ A61C 17/3418; A61C 17/3445; A61C 17/3481; A46B 5/0095; A46B 7/04; A46B 7/042; A46B 7/044; A46B 13/00; A46B 13/02; A46B 13/023
USPC ............................ 15/22.1, 145, 176.1, 176.6
See application file for complete search history.

(56) References Cited

U.S. PATENT DOCUMENTS

| | | | |
|---|---|---|---|
| 9,204,948 | B2 | 12/2015 | Kloster |
| 9,724,180 | B1 | 8/2017 | Liu |
| 10,912,377 | B1* | 2/2021 | Kuang ................ A61C 17/222 |
| 11,071,613 | B1 | 7/2021 | Zhou |
| 11,096,768 | B1 | 8/2021 | Lin |
| 2001/0014990 | A1 | 8/2001 | Fritsch et al. |
| 2004/0010872 | A1 | 1/2004 | Chiang |
| 2005/0108838 | A1* | 5/2005 | Schaefer ................ A61C 17/22 |
| | | | 15/22.1 |
| 2010/0043156 | A1 | 2/2010 | Kressner |
| 2010/0251493 | A1 | 10/2010 | Sale et al. |
| 2010/0273126 | A1 | 10/2010 | Janssen et al. |
| 2011/0107536 | A1 | 5/2011 | Dabrowski et al. |
| 2014/0150190 | A1* | 6/2014 | Fattori ................ A61C 17/3481 |
| | | | 15/22.1 |
| 2014/0341636 | A1 | 11/2014 | Fattori |
| 2015/0082560 | A1 | 3/2015 | Graeve |
| 2015/0209125 | A1 | 7/2015 | Fattori |
| 2021/0100346 | A1 | 4/2021 | Dishon |
| 2021/0289930 | A1 | 9/2021 | Wagner |

FOREIGN PATENT DOCUMENTS

| | | | |
|---|---|---|---|
| CN | 103269654 A | | 8/2013 |
| CN | 108087438 A | | 5/2018 |
| CN | 110025390 A | | 7/2019 |
| CN | 113081355 A | | 7/2021 |
| DE | 102006060134 | * | 6/2008 |
| FR | 2476994 | * | 9/1981 |
| JP | 53-21650 | * | 2/1978 |
| JP | H06-084928 U | | 12/1994 |
| JP | 2001-524331 A | | 12/2001 |
| JP | 2011-506025 A | | 3/2011 |
| JP | 2015-160127 A | | 9/2015 |
| WO | 2009/094820 | * | 8/2009 |
| WO | 2010/001197 A1 | | 1/2010 |
| WO | 2019072994 A1 | | 4/2019 |
| WO | 2021110464 A1 | | 6/2021 |

OTHER PUBLICATIONS

Non-Final Rejection dated Oct. 28, 2021 for U.S. Appl. No. 17/396,176 which is the parent application of the instant application.

Non-Final Rejection dated Dec. 24, 2021 for U.S. Appl. No. 17/396,146 which is the parent application of the instant application.

* cited by examiner

BRUSHHEAD FOR POWER TOOTHBRUSH

RELATED APPLICATIONS

This application claims the benefit of priority to Chinese Patent Application Number 202021631331.2 filed on Aug. 7, 2020 and Chinese Patent Application Number 202120794447.6 filed on Apr. 16, 2021, in the China National Intellectual Property Administration. The entire contents of the above-identified application are hereby incorporated by reference.

TECHNICAL FIELD

The disclosure relates to the technical field of power toothbrush, and particularly relates to a brushhead for a power toothbrush.

BACKGROUND

While living standards continue to improve, people concern more on dental health, and the use of power toothbrushes is becoming popular.

Currently, there are two types of commercially available power toothbrushes. One is a power toothbrush rotating and vibrating bristles by a motor, and the other is an ultrasonic power toothbrush allowing high-frequency vibration of the brushhead. These two types of power toothbrushes commonly make the bristles vibrate to achieve teeth cleaning. The brushhead is detachably attached to a handle of the power toothbrush. A drive rod of the handle engages with the brushhead to drive the brush head to vibrate. Thus, there is a requirement to design a structure to transmit vibration from the drive rod to the brushhead.

BRIEF DESCRIPTION OF DRAWINGS

Implementations of the present disclosure will now be described, by way of embodiment, with reference to the attached figures.

DETAILED DESCRIPTION

Figure 1:
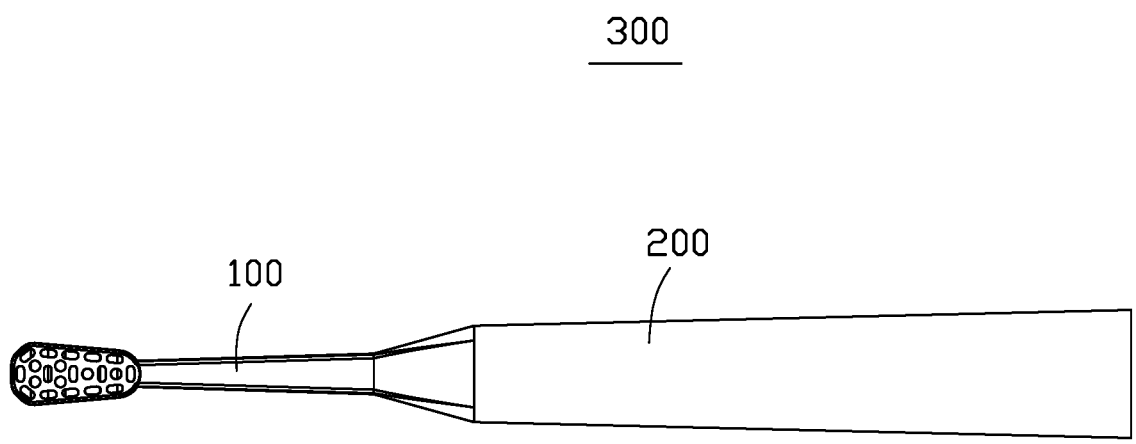
FIG. 1 is a front view showing a power toothbrush according to one embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references may mean "at least one".

Figure 2:
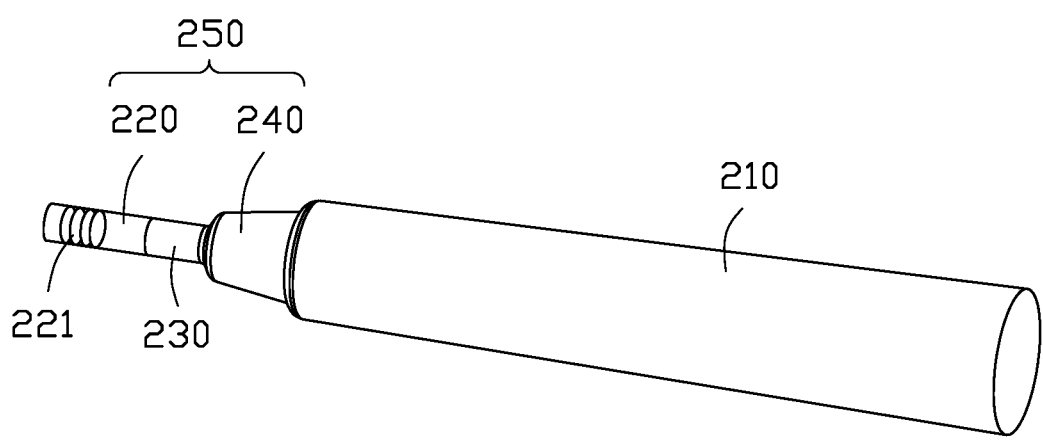
FIG. 2 is a front view showing a handle of the power toothbrush shown in FIG. 1.

Referring to FIG. 1 and FIG. 2, a power toothbrush 300 comprises a handle 200 and a brushhead 100. The brushhead 100 is detachably attached to the handle 200 of the power toothbrush 300. The handle 200 comprises a housing 210 and a vibrating drive shaft 250 extending out of the handle 200. A motor (not shown), a control board (not shown), and a battery (not shown) are received in the housing 210, with one end of the vibrating drive shaft 250 connected to the motor. At least part of the vibrating drive shaft is inserted into the brushhead 100 when the brushhead 100 attached to the handle 200. The vibrating drive shaft 250 comprises a first metal portion 220, a second metal portion 230 and a fixing portion 240. The first metal portion 220, the second metal portion 230 and the fixing portion 240 are inserted into the brushhead 100.

First Embodiment

In the present disclosure, referring to FIG. 3 through FIG. 6, the brushhead 100 comprises a main body 10 and an engaging assembly 20. The engaging assembly 20 is received in the main body 10 and engages with the vibrating drive shaft 250. An outer surface of the main body 10 is further provided with a recess 12 for receiving the engaging assembly 20.

The main body 10 is provided with a receiving cavity 31 which is configured to receive at least a portion of the vibrating driving shaft 250. An opening 11 is defined in the end 101 of the main body 10, the opening 11 extends in a first direction X', and the opening 11 is receive at least a part of the vibrating drive shaft 250, The first direction X' is the extension direction of the vibrating drive shaft 250 after the vibrating drive shaft 250 is installed into the main body 10. The opening 11 is in air communication with the receiving cavity 31, so that the at least a portion of the vibrating driving shaft 250 may be received in the receiving cavity 31 after being inserted through the opening 11.

The engaging assembly 20 comprises an elastic member 40 received in the recess 12 of the main body 10, and a cover 50 covering the recess 12. The elastic member 40 extends in the first direction X' and presses at least a part of the vibrating drive shaft 250 in the second direction Y'. In this way, the main body 10 is firmly connected to at least a part of the vibrating drive shaft 250. The second direction Y' is a direction from the outer surface 102, from which the recess 12 is defined, towards an interior of the main body 10. In other embodiments, the elastic member 40 may also abut at least a part of the vibrating drive shaft 250 in other directions perpendicular to the first direction X', as long as the vibrating drive shaft 250 can be firmly connected to the main body 10 by the elastic member 40.

In this way, the recess 12 for receiving the engaging assembly 20 is defined in the outer surface 102. On the one hand, the main body 10 can be firmly connected to the handle 200 by the elastic member 40 abut the vibrating drive shaft 250, and vibration of the brushhead 100 by vibration of the handle 200 is achieved.

Figure 3:
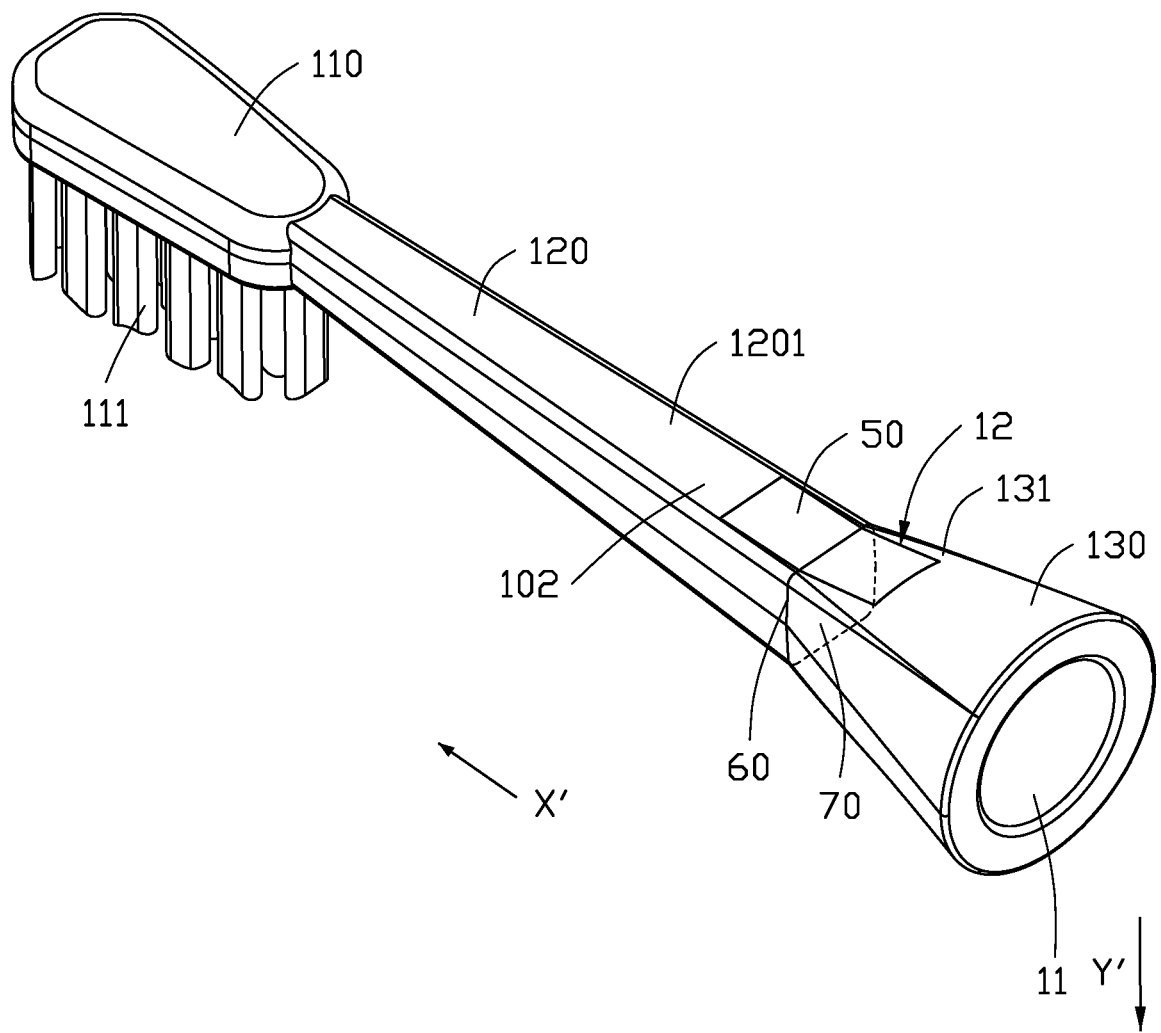
FIG. 3 is a perspective structural view showing a brushhead for the power toothbrush of FIG. 1 according to the present disclosure.
Figure 4:
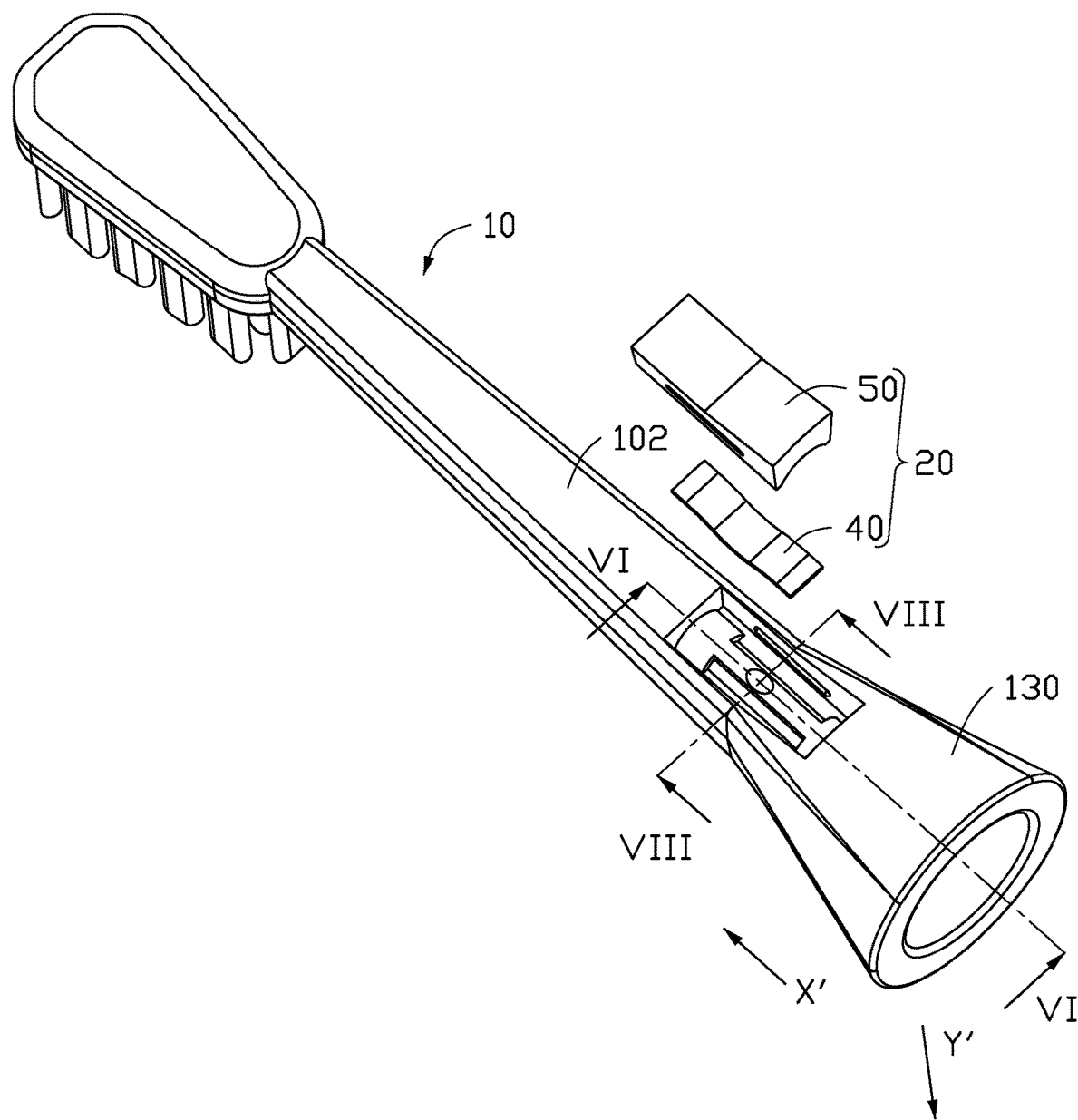
FIG. 4 is an exploded view of the brushhead for the power toothbrush according to a first embodiment of the present disclosure.

Referring to FIG. 3, the main body 10 comprises a bristle carrier 110, a neck portion 120 and an insertion portion 130. The bristle carrier 110 and the insertion portion 130 are respectively located at two ends of the neck portion 120. The bristle carrier 110 is provided with a plurality of bristle bundles 111 to clean teeth and oral cavities. The bristle carrier 110 may be of any known structure, which is not described herein again.

In the present disclosure, the neck portion 120 has an elongated rod-shaped structure, which is approximately a rectangular parallelepiped shape, and the insertion portion 130 has an approximately truncated conical shape. In other embodiments, the neck portion 120 may also be approximately cylindrical, and the insertion portion 130 may also have other shapes, and the present disclosure does not specifically limit the shapes thereof.

The neck portion 120 comprises a first surface 1201, the insertion portion 130 comprises a second surface 131, and the recess 12 is provided at a junction of the first surface 1201 and the second surface 131.

The main body 10 is made of ABS plastic, PP plastic or POM plastic. In other embodiments, the main body 10 may also be made of other plastic materials or other non-plastic material, but are not limited to the examples provided in the present disclosure. Using the above materials will increase the safety and the elasticity of the main body 10.

Figure 5:
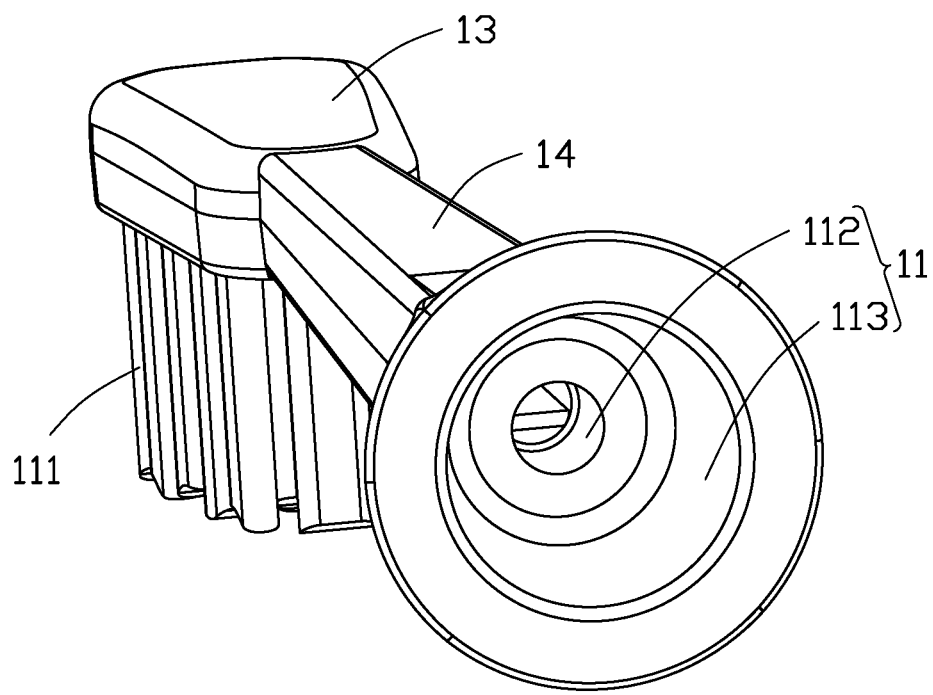
FIG. 5 is a perspective view of the brushhead for the power toothbrush shown in FIG. 3 from another angle according to the present disclosure.
Figure 6:
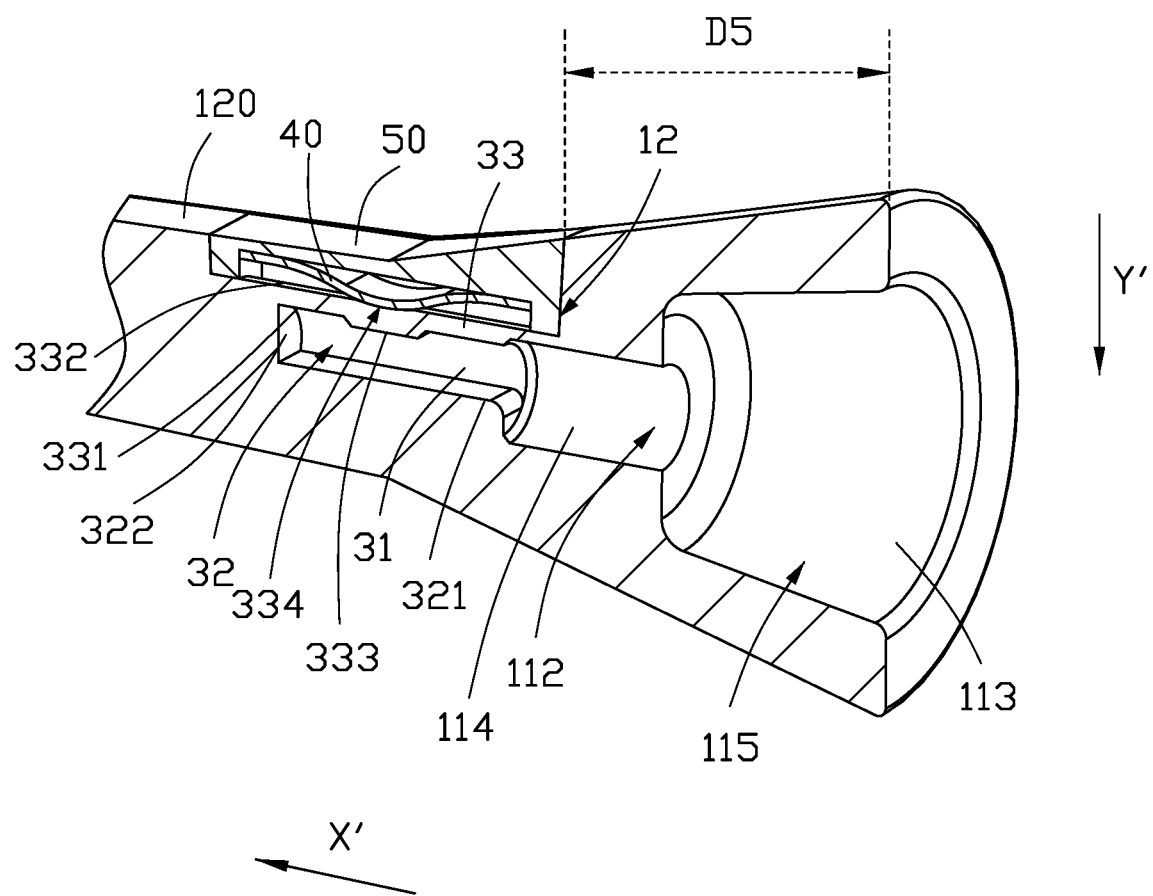
FIG. 6 is a cross-sectional view of a pan of the brushhead shown in FIG. 4 taken along a view line VI-VI according to the present disclosure.

Further with reference to FIGS. 5 and 6, the opening 11 comprises a first opening 112 and a second opening 113. The receiving cavity 31 and the second opening 113 are respectively located at two ends of the first opening 112, the second opening 113 is located at an end of the insertion portion 130 close to the handle 200. The first opening 112 and the second opening 113 are in air communication and respectively receive the second metal portion 230 and the fixing portion 240 of the handle 200.

In the present disclosure, the second metal portion 230 does not contact an inner surface 114 of the first opening 112 and the fixing portion 240 does not contact an inner surface 115 of the second opening 113 of the vibrating drive shaft 250 to prevent the vibration of the brush head 100 driven by the vibrating drive shaft 250 from being affected.

Referring to FIGS. 2 and 6, the main body 10 comprises a cavity wall 32 and an abutment wall 33 forming the receiving cavity 31. At least a part of the elastic member 40 abuts the abutment wall 33. When the brushhead 100 is in an assembled state, the abutment wall 33 abuts the first metal part 220 of the vibrating drive shaft 250 under the elastic force of the elastic member 40.

In the present disclosure, the first metal portion 220 is provided with a pattern 221, and the abutment wall 33 abuts the pattern 221, which enhances friction between the vibrating drive shaft 250 and the brushhead 100 so as to increase a connection therebetween.

Figure 7:
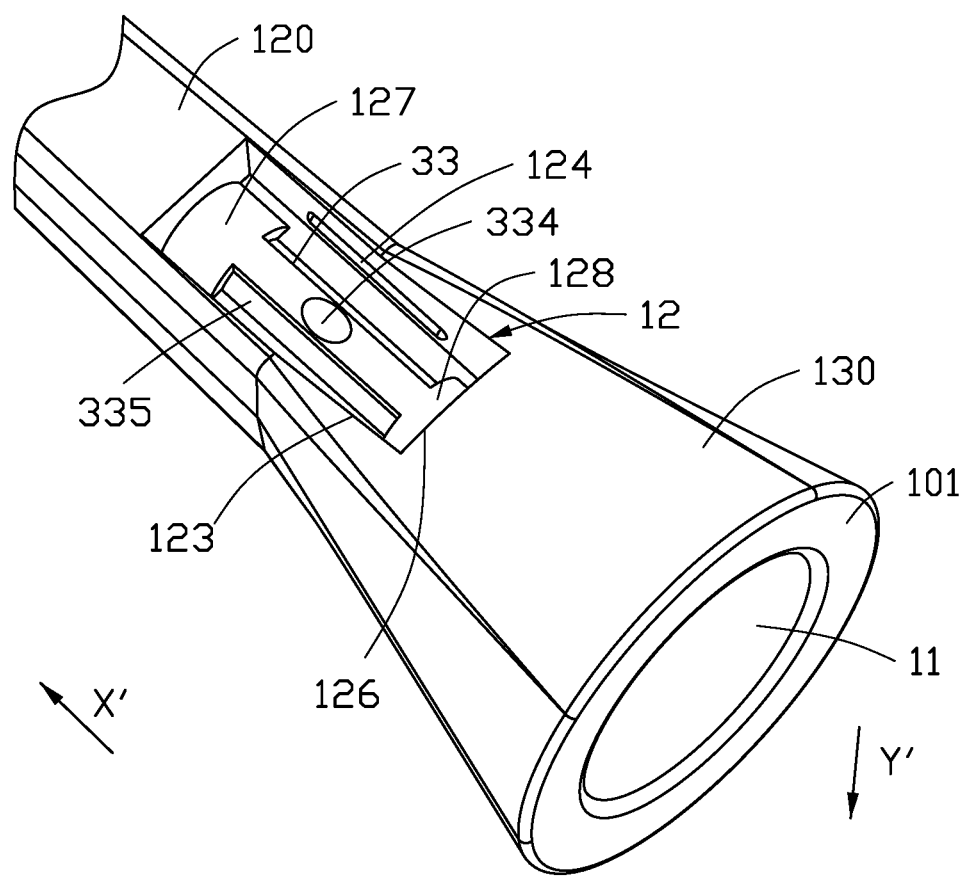
FIG. 7 is a partial view of a main body of the brushhead shown in FIG. 3 according to the present disclosure.

Further with reference to FIG. 6 and FIG. 7, the abutment wall 33 comprises a first wall surface 331 and a second wall surface 332 disposed opposite to each other. The first wall surface 331 is a surface of the abutment wall 33 facing the receiving cavity 31, and is convexly provided with a convex portion 333. The convex portion 333 is configured to abut the pattern 221 on the first metal portion 220 of the vibrating drive shaft 250.

The convex portion 333 protrudes from the first wall surface 331 of the abutment wall 33, when elastic force of the elastic member 40 applies toward the abutment wall 33, the abutment wall 33 may transfer the applied elastic force to abut and further firmly lock the vibrating drive shaft 250 to receiving cavity 31, which prevent the brushhead 100 from falling off the handle 200, and vibrations of the brushhead 100 may be further stabilized and quiet.

The second wall surface 332 is the surface of the abutment wall 33 facing away from the receiving cavity 31. The second wall surface 332 is formed with a convex portion 334, at least a part of the elastic member 30 abuts the concave portion 334, and the position of the convex portion 333 corresponds to the position of the concave portion 334.

Specifically, at least a part of the elastic member 40 abuts the concave portion 334 on the second wall surface 332, so that the elastic force of the elastic member 40 may be directed at the concave portion 334 of the abutment wall 33, and the abutment wall 33 may transfer the applied elastic force to lock the vibrating drive shaft 250. In this way, the brushhead 100 is prevented from falling off, and the vibrations of the brushhead 100 may be further stabilized and quiet.

As described above, the main body 10 and the handle 200 are connected. The vibration of the brushhead 100 by vibration of the handle 200 is achieved. The structure for connecting the main body 10 and the handle 200 is simple. Therefore, the brushhead 100 has a simple structure, is easy to manufacture, and has low manufacturing cost.

Figure 8:
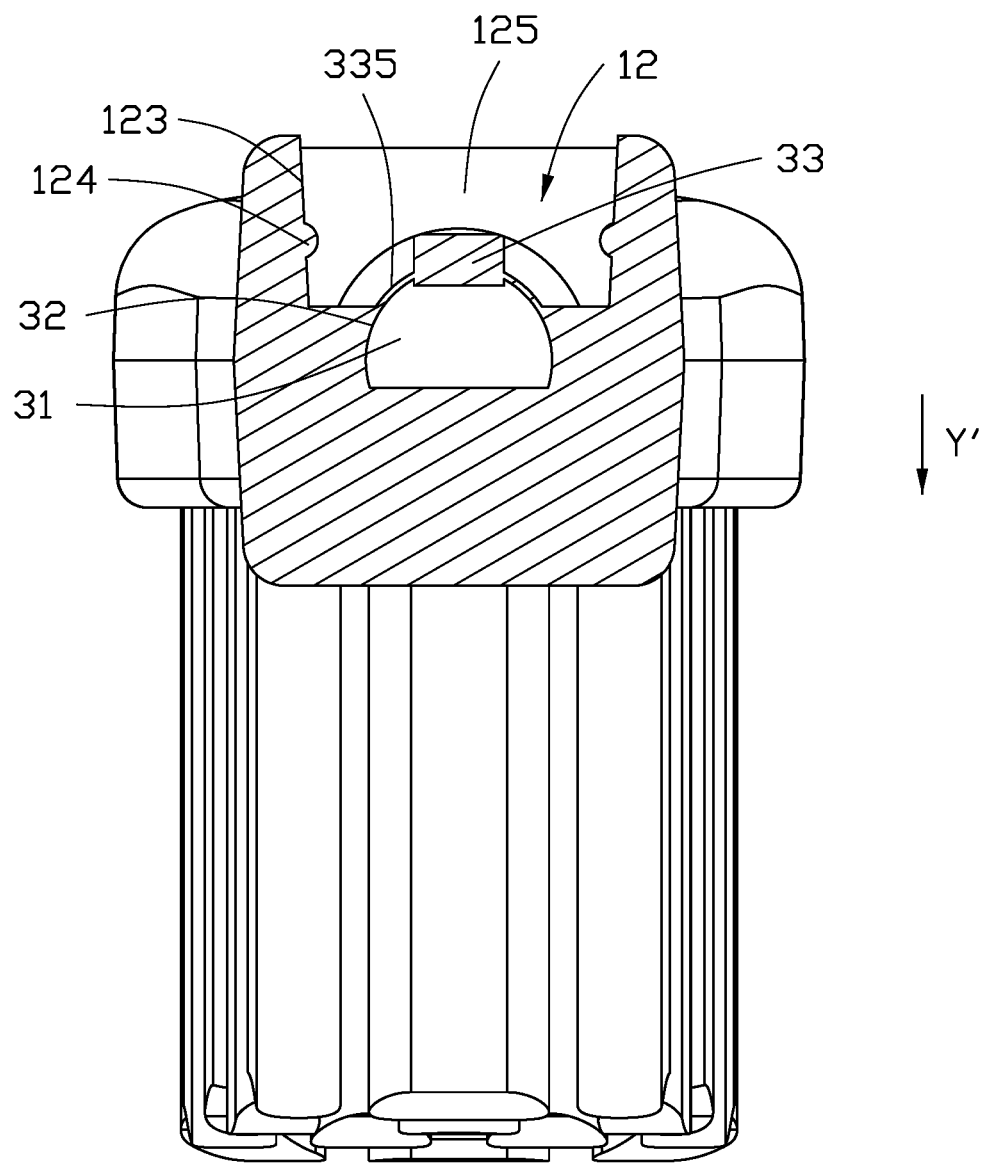
FIG. 8 is a cross-sectional view of the brushhead for the power toothbrush shown in FIG. 4 along a view line according to the present disclosure.

With reference to FIG. 7 and FIG. 8, in the present disclosure, the two sides of the abutment wall 33 are connected to the cavity wall 32 by an isolation layer 335, and the thickness of the isolation layer 335 is smaller than the thickness of the abutment wall 33.

The thickness of the isolation layer 335 ranges from about 0.05 to 2.0 mm, for example, 0.08 mm, 0.1 mm, and 1.5 mm, etc. The length of the abutment wall 33 is about 2.0-13.5 mm, for example, 4.0 mm, 8.5 mm, and 10 min, etc. The width of the abutment wall 33 is in the range of about 0.5-3.0 mm, for example 0.8 mm, 1.5 mm, and 3.0 mm, etc. The thickness of the abutment wall 33 is in the range of about 0.5-2.0 mm, for example, 0.5 mm, 0.8 mm, and 1.5 mm, etc.

With the isolation layer 335 of the above-mentioned size provided between the abutment wall 33 and the cavity wall 32, the vibration of the abutment wall 33 is not affected, and foreign matters such as water and dust in the recess 12 may be further prevented from entering the receiving cavity 31.

Another embodiment of the present disclosure will be described below with reference to FIG. 9 through FIG. 10. Note that, for convenience of explanation, the same reference signs are assigned to components having the same function as those described in the above-described embodiment, and description thereof is omitted.

A slit 336 is provided between the two sides of the abutment wall 33 and the cavity wall 32.

The abutment wall 33 has flexibility thus it allows for easy removal of the abutment wall 33 from the molding during the manufacturing process, which may reduce the cost of the mold and thereby reduce the manufacturing cost.

In the present disclosure, with reference to FIG. 6, the cavity wall 32 further comprises a first limiting wall 321 and a second limiting wall 322. The first limiting wall 321 is disposed opposite to the abutment wall 33, and the first limiting wall 321 may effectively prevent the vibrating drive shaft 250 from shaking or rotating when the first metal portion 220 of the vibrating drive shaft 250 is received in the receiving cavity 31. The second limiting wall 322 and the first limiting wall 321 are arranged perpendicularly to prevent the vibrating drive shaft 250 from moving in the first direction X' and the second direction Y'.

The elastic member 40 is received in the cover 50 and is disposed opposite to the abutment wall 33, so as to abut the abutment wall 33 along the direction of the outer surface 102 of the main body 10 toward the receiving cavity 31. The abutment wall 33 is thereby provided with the external force to abut the vibrating drive shaft 250.

With the elastic member 40 as described above to abut the abutment wall 33, sufficient external force is applied to the abutment wall 33 to about the vibrating drive shaft 250.

Figure 11:
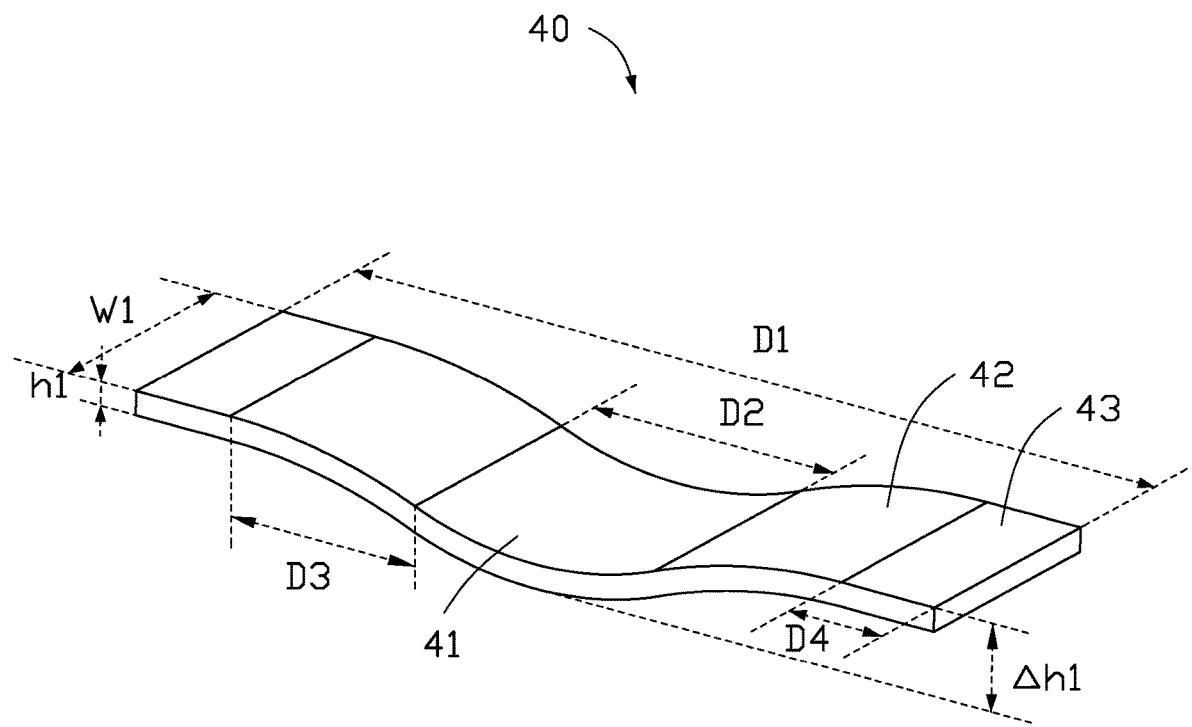
FIG. 11 is a perspective view of an elastic member of the brushhead in FIG. 1.
Figure 12:
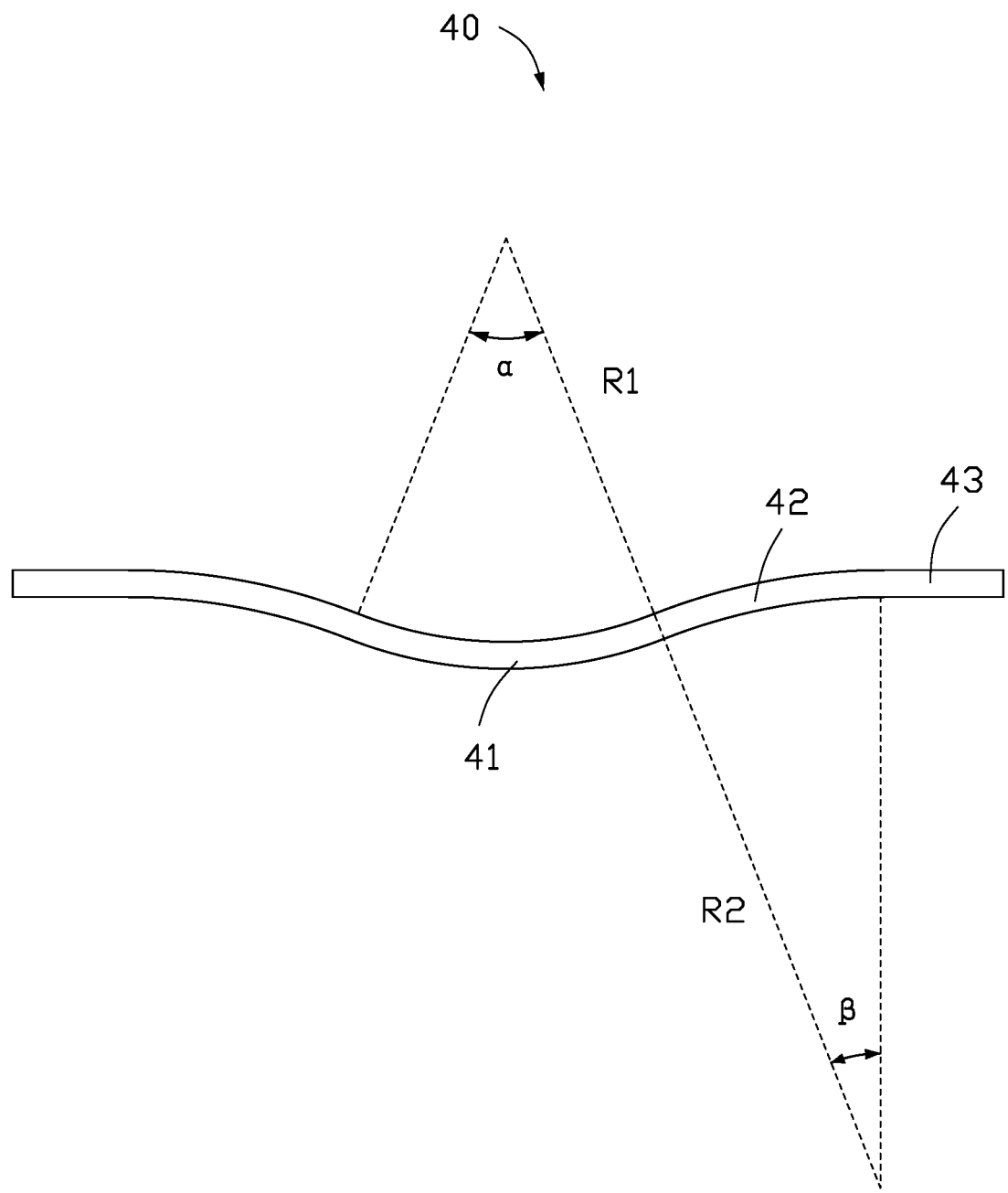
FIG. 12 is a side view of the elastic member shown in FIG. 11.

With reference to FIG. 11 and FIG. 12, in the present disclosure, the elastic member 40 has a sheet structure, specifically, the elastic member 40 is a curved sheet. The elastic member 40 comprises a first curved surface portion 41, two second curved surface portions 42, and two first flat surface portions 43. Two second curved surface portion 42 are respectively located at both ends of the first curved surface portion 41, and two first flat surface portions 43 are respectively located at two ends of the second curved surface portion 42 away from the first curved surface portion 41. The first curved surface portion 41 and the second curved surface portion 42 have an arc-shape, and the first curved surface portion 41 is curved in a direction opposite to a curved direction of the second curved surface portion 42.

With such a shape, the elasticity of the elastic member 40 is provided, the engagement strength is provided, which prevents the brushhead 100 from falling off in practical applications, maintains stable vibration, therefore reduces vibration noise, and increases durability and longevity.

In the present disclosure, referring to FIG. 12, a radius R1 of a curve where the first curved surface portion 41 is located is about 2-10 mm, and a first central angle α corresponding to the first curved surface portion 41 is in the range of about 38-48 degrees. A radius R2 of a curve where the second curved surface portion 42 is located is about 3-10 mm, and a second central angle β corresponding to the second curved surface portion 42 is in the range about 15-30 degrees.

By selecting the shape as described above and the two-sided first flat surface portions 43 as supporting points, sufficient resilience may be generated when the first curved surface portion 41 is under stress. If the arc of the first curved surface portion 41 and/or the second curved surface portion 42 of the elastic member 40 is too large or too small, it is difficult to achieve the desired elastic force, making the engaging strength insufficient, and the brushhead 100 would fall off easily in practical applications. In the present disclosure, the use of the above-mentioned elastic member 40 provides the elastic force of the elastic member 40 and the engaging strength between the brushhead 100 and the vibrating drive shaft 250, which prevents the brushhead 100 from falling off in practical applications. The electronic toothbrush of the present disclosure provides stable and low-noise vibrations as well as a long-life span.

Referring to FIG. 11, a range of a linear distance D1 between the mutually distant ends of the two first flat surface portions 43 in the elastic member 40 ranges from about 8.0 mm to 15.0 mm, for example 10 mm, 11 mm, etc. A thickness h1 of the elastic member 40 ranges from about 0.15 to 0.5 mm, for example, 0.2 mm, 0.3 mm, etc. A width w1 of the elastic member 40 ranges from about 1.0 to 7.0 mm, for example 3.0 mm, 4.0 mm, 5.0 mm, etc.

In the present disclosure, a ratio of the distance D2 between two ends of the first curved surface portion 41 is in the range of about 20-40%, and a sum of a distance D3 of the two second curved surface portions 42, that is, the ratio of 2×D3 is in the range of about 37-57%, and a sum of the proportions of a distance D4 between the two plane portions 43, that is, the proportion of 2×D4 is in the range of about 13%-33%.

In addition, a vertical distance Δh1 between the flat surface portion 43 and the first curved surface portion 41 ranges from about 0.5 mm to 5.0 mm.

In other embodiments, the distance between two ends of the elastic member 40, the distance of the first curved surface portion 41, the second curved surface portion 42, and the flat surface portion 43 may be adjusted accordingly as required.

The first curved surface portion 41 of the elastic member 40 abuts the concave portion 334, so as to apply an external force to the abutment wall 33.

The convex portion 333 abuts the pattern 221 on the vibrating drive shaft 250 of the handle 200, and the first curved surface portion 41 of the elastic member 40 abuts the concave portion 334, the elastic force of the elastic member 40 is directed at the concave portion 334 and then abuts the vibrating drive shaft 250 so as to prevent the elastic force from spreading in other directions.

The material of the elastic member 40 may be beryllium copper or stainless steel. In other embodiments, the elastic member 40 may also be made of other materials, and the present disclosure does not specifically limit the materials thereof. By selecting the above-mentioned materials, the elastic force of the elastic member 40 may be provided as well as the engaging strength between the brushhead 100 and the vibrating drive shaft 250.

Figure 10:
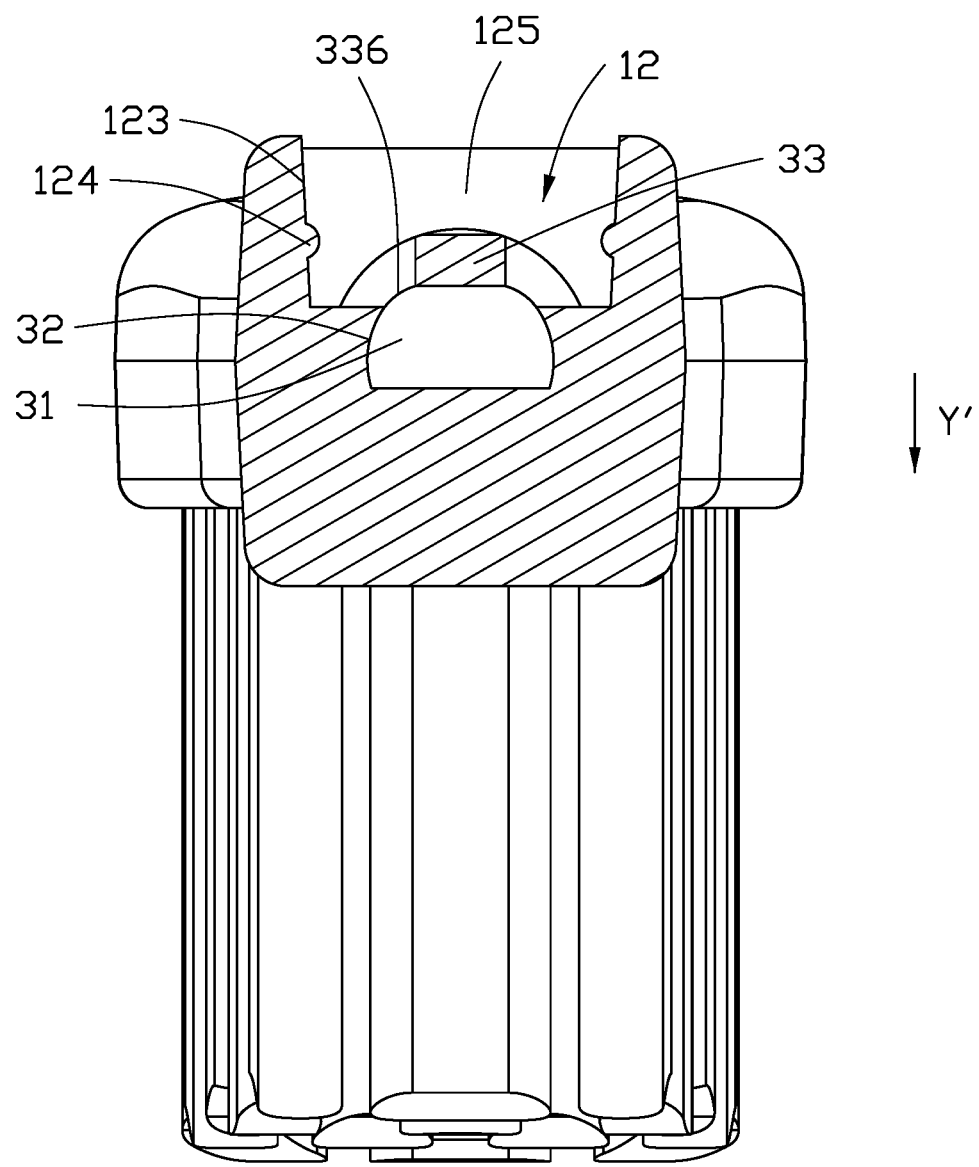
FIG. 10 is a cross-sectional view of the brushhead shown in FIG. 9 along a view line X-X according to the present disclosure.
Figure 13:
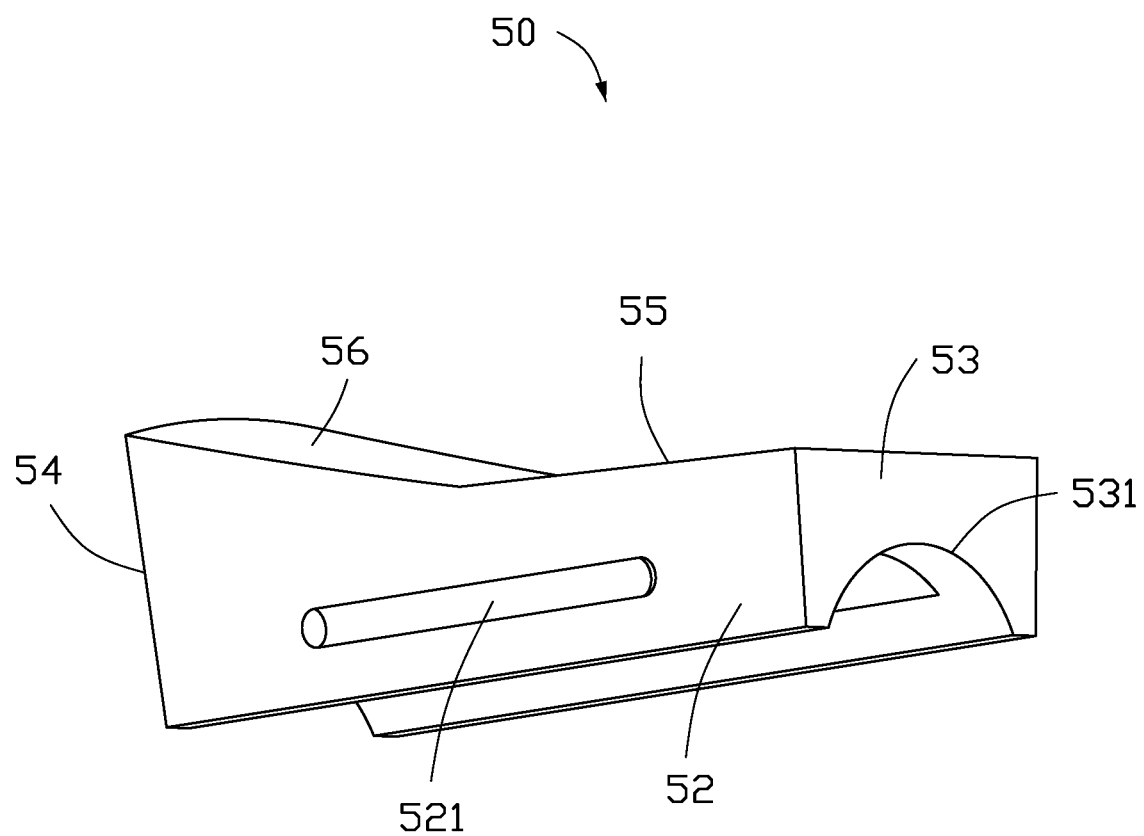
FIG. 13 is a perspective view of a cover of the brushhead in FIG. 1 according to the present disclosure.
Figure 14:
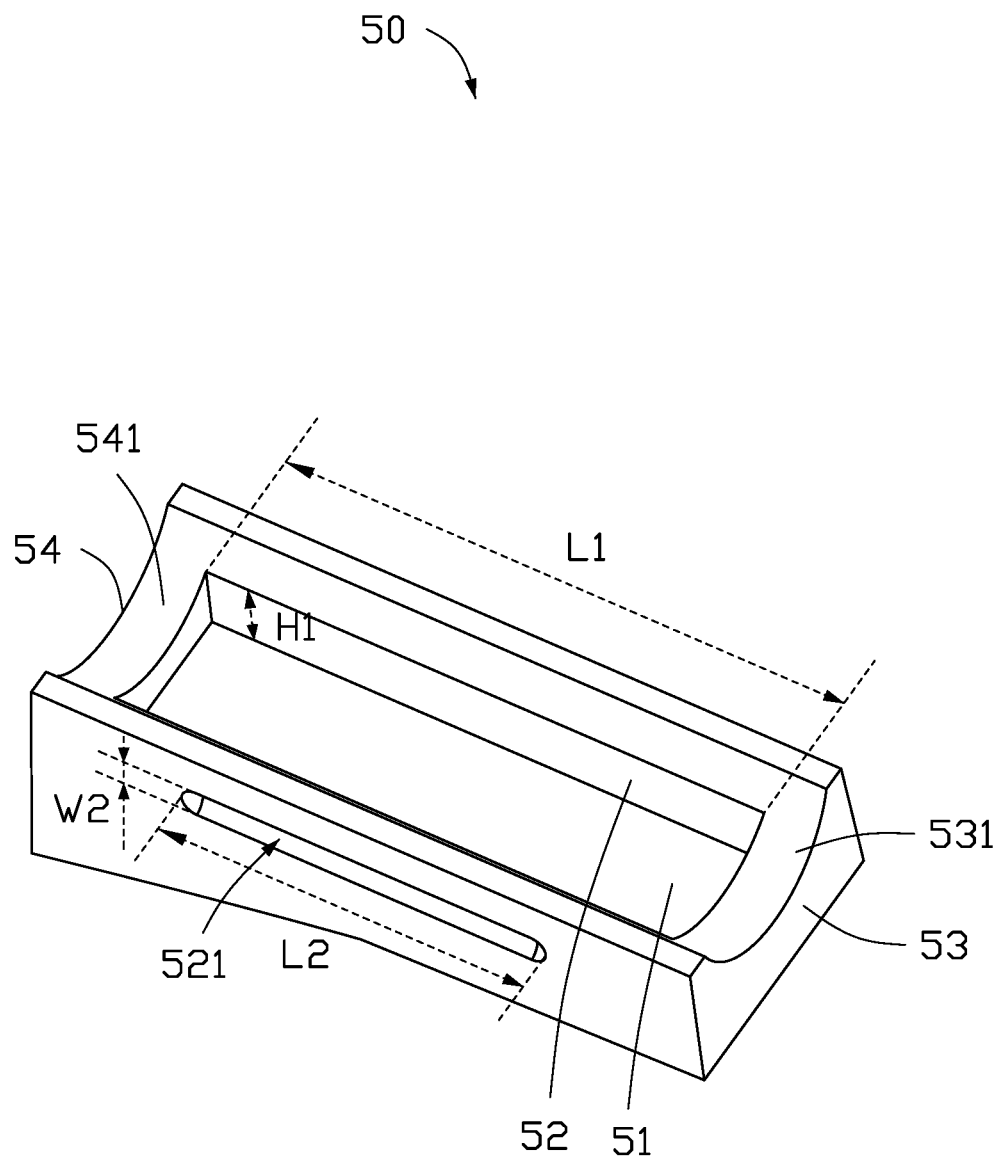
FIG. 14 is another perspective view of the cover shown in FIG. 13.

With reference to FIG. 10, FIG. 13, and FIG. 14, the cover 50 is engaged in the recess 12 by an engagement structure to fix the elastic member 40 to the main body 10. In the present disclosure, the cover 50 has a receiving groove 51 that is used for accommodating the elastic member 40, which has a sheet structure, and two ends of the sheet structure of the elastic member 40 abut against two ends of the receiving groove 51, which allows the elastic member 40 to generate a sufficient resilience force when it is subjected to force.

Referring to FIG. 10 and FIG. 14, the recess 12 comprises two opposite first inner walls 123, each first inner wall 123 comprises an engaging portion 124 protruding therefrom along the first direction X', and the cover 50 comprises two first side walls 52 arranged opposite to each other extending along the longitudinal direction thereof. Each of the first side walls 52 is provided with an engaging groove 521 on an outer surface of the first side wall 52, in which the engaging portion 124 is engaged. In this way, the cover 50 may be easily and firmly engaged in the recess 12.

With reference to FIG. 14, a length L2 of the engaging groove 521 of the cover 50 ranges from about 5 mm to 13 mm, for example 7.0 mm, 10 mm, etc. A width W2 ranges from about 0.2 mm to 3.5 mm, further, the width W2 ranges from about 0.2 to 1.5 mm, for example 0.6 mm, 1.2 mm, etc. It is understood that the size of the engaging portion 124 matches the engaging groove 521 so as to be able to engage the engaging portion 124 in the engaging groove 521.

The engaging portion 124 is located on the side of the first inner wall 123 close to the cavity wall 32. Correspondingly, the engaging groove 521 is located on the side of the first side wall 52 close to the cavity wall 32 in the assembled state, so that the engaging portion 124 may be more stably engaged in the engaging groove 521.

In this way, the cover 50 may be firmly engaged in the recess 12. The cover 50 may be fixed in the recess 12 in other ways, the present disclosure does not specifically limit the fixing manner.

The engaging portion 124 is in the shape of a strip (e.g., FIG. 7), and an arc transition surface is formed between the outer surfaces of the engaging portions 124 adjacent to each other, which allows for easy removal of the engaging portion 124 from the molding during the manufacturing process and lowers molding costs. In other embodiments, the engaging portion 124 may also be any other shape that allows for ease of engagement, however, is not limited to the examples provided in the present disclosure.

Of course, in other embodiments, the first inner wall 123 may be provided with an accommodating groove, and the first side wall 52 may be provided with an engaging portion in the first direction X', so that the engaging portion is engaged in the accommodating groove, and the cover 50 is engaged in the recess 12.

It is understood that in other embodiments, the outer surface of the cover 50 may be provided with any other desired patterns, shapes, colors, etc., but is not limited to the examples provided in the present disclosure.

Furthermore, the two first inner walls 123 of the recess 12 are arranged obliquely along the second direction Y' and approaching each other, the angle between the first inner walls 123 and a plane along the second direction Y' ranges from 3 to 5 degrees, for example, 3.5 degrees, 4 degrees, etc. The first side wall 52 and the first inner wall 123 are inclined. The second direction Y' is in a direction from an outer surface of the recess 12 provided in the main body 10 towards an interior of the main body 10.

Referring to FIG. 7, FIG. 8, and FIG. 13, the recess 12 further comprises a second inner wall 125 and a third inner wall 126 disposed oppositely, and the cover 50 further comprises a second side wall 53 and a third side wall 54 disposed oppositely. The outer surface of the second side wall 53 is arranged toward the second inner wall 125, the outer surface of the third side wall 54 is arranged toward the third inner wall 126, the second inner wall 125 and the third inner wall 126 are arranged obliquely along the second direction Y' and close to each other. The angles between the second inner wall 125 and the plane along the second direction Y' and the angle between the third inner wall 126 and the plane along the second direction Y' are both in the range of 3-5 degrees, the second side wall 53 and the second inner wall 125 are inclined, and the third side wall 54 and the third inner wall 126 are inclined.

In the present disclosure, such an inclined arrangement is provided, and it may play a certain guiding role, thereby facilitating assembly, expediting the installation speed, and reducing the assembly cost. In other embodiments, the first inner wall 123 and the second inner wall 125 may not be inclined but are not limited to examples provided herein.

Figure 9:
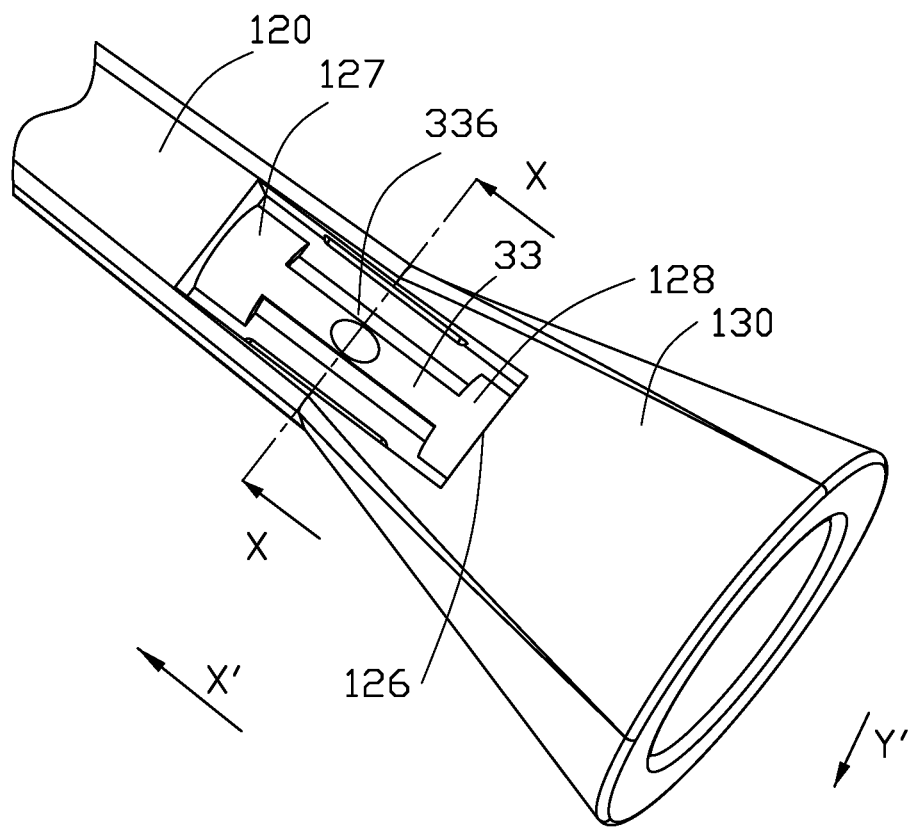
FIG. 9 is a partial view of the main body of another embodiment of the brushhead according to the present disclosure, and is similarly viewed as in FIG. 7.

Referring to FIG. 6, FIG. 9, and FIG. 14, a vertical distance D5 between the third inner wall 126 of the recess 12 and an end surface of the insertion portion 130 away from the neck portion 120 is in the range of 5-25 mm, for example 10 mm, 12.3 mm, and 15 mm etc. A first arc groove 531 is formed on the second side wall 53, and a second arc groove 541 is formed on the third side wall 54. A first mounting portion 127 and a second mounting portion 128 are provided at both ends of the abutment wall 33 in the recess 12, so as to be able to stably receive the cover 50 in the recess 12.

An angle between the first mounting portion 127 and the abutment wall 33 and an angle between the second mounting portion 128 and the abutment wall 33 are right angles. In other embodiments, corners formed between the first mounting portion 127 and the second mounting portion 128 and the abutment wall 33 may also be arc-shaped, which is not specifically limited by examples provided in the present disclosure.

With reference to FIG. 14, a length L1 of the receiving groove 51 in the cover 50 is in the range of 8 to 15 mm, for example 10 mm, 11 mm, and 13 mm etc. A height H1 of the first side wall 52 is in the range of 1.0 to 2.0 mm, for example 1.4 mm, 1.8 mm etc.

The size of the receiving groove 51 matches the size of the elastic member 40, which is not limited to the examples provided herein. The dimensions of the cover 50 and the recess 12 may be adjusted.

In the present disclosure, the cover 50 comprises a third surface 55 and a fourth surface 56 as shown in FIG. 13. With reference to FIG. 3, in the assembled state, the third surface 55 is on the same surface as the first surface 1201, and the fourth surface 56 is on the same surface as the second surface 131. Thus, the outer surface of the cover 50 can match the outer surface of the main body 10 without affecting the overall appearance of the brushhead 100.

The receiving cavity 31 is provided in the neck portion 120 and the insertion portion 130, and the abutment wall 33 and the recess 12 are symmetrical with respect to a plane 70 of a boundary line 60 between the neck portion 120 and the insertion portion 130.

The recess 12 for receiving the engaging assembly 20 is provided on the side surface of the main body 10, and the cover 50 is engaged in the recess 12, so that the overall appearance of the main body 10 is not affected, and the stability of the connection between the main body 10 and the handle 200 can be ensured.

When assembling the brushhead 100 of the power toothbrush 300, the elastic member 40 is first placed in the receiving groove 51 of the cover 50, and then the cover 50 is engaged in the recess 12.

The brushhead 100 provided by the present disclosure comprises the main body 10 that is provided with a receiving cavity 31 along the first direction X, and the receiving cavity 31 receives at least a part of the vibrating drive shaft 250. The main body 10 comprises the cavity wall 32 and the abutment wall 33 for forming the receiving cavity 31. When the brushhead 100 is in the assembled state, the abutment wall 33 abuts at least a part of the vibrating drive shaft 250. The elastic member 40, which is arranged opposite to the abutment wall 33 so as to abut the abutment wall 33 along the direction of the outer surface of the cavity wall 32 toward the inner surface thereof to provide the abutment wall 33 with the external force to abut the vibrating drive shaft 250.

The brushhead 100 provided by the present disclosure abuts the abutment wall 33 through the elastic member 40, which may provide the abutment wall 33 with the external force to abut the vibrating drive shaft 250. In this way, the main body 10 and the handle 200 are connected, and the vibration of the brushhead 100 by vibration of the handle 200 is achieved. The structure for connecting the main body 10 and the handle 200 is simple, and no additional connecting pieces are required. Therefore, the brushhead 100 has a simple structure, is easy to manufacture, and has low manufacturing costs.

In addition, the brushhead 100 of the present disclosure is directly attached to the handle 200 of the power toothbrush 300. In this way, only the connection between the elastic member 40 and the main body 10, and the connection between the brushhead 100 and the handle 200 needs to be considered during the assembly process, so that any offset between the brushhead 100 and the handle 200 can be effectively prevented, and the stability of the power toothbrush 300 during use can be ensured, and the appearance effect is good.

Second Embodiment

Hereinafter, a second embodiment of the present disclosure will be described with reference to FIG. 15 through FIG. 18. In addition, for convenience of description, components having the same functions as those described in the above-described embodiments are denoted by the same reference numerals, and the description thereof will not be repeated.

Figure 15:
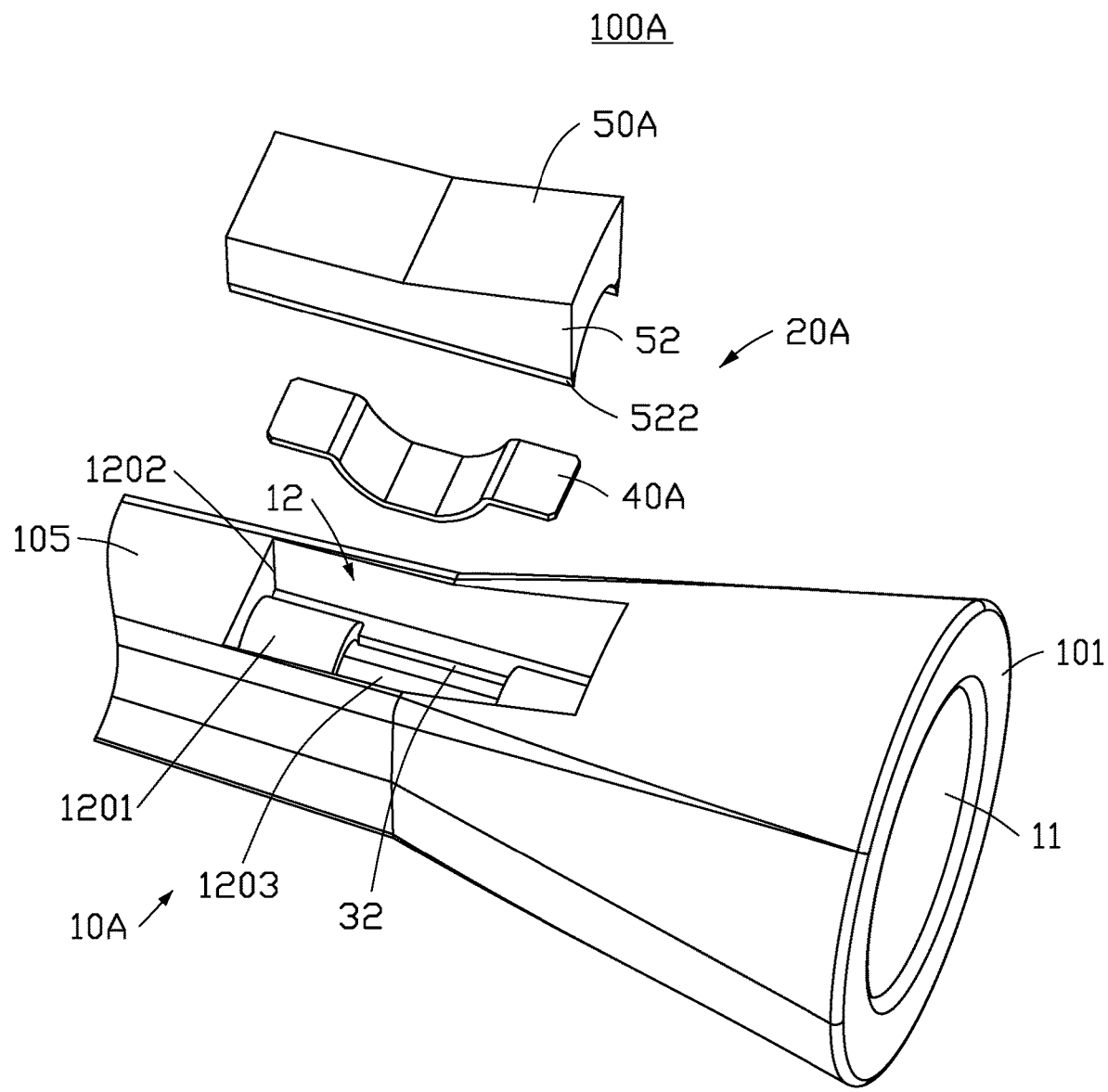
FIG. 15 is an exploded view of a brushhead of a second embodiment, and is similarly viewed as in FIG. 4.
Figure 16:
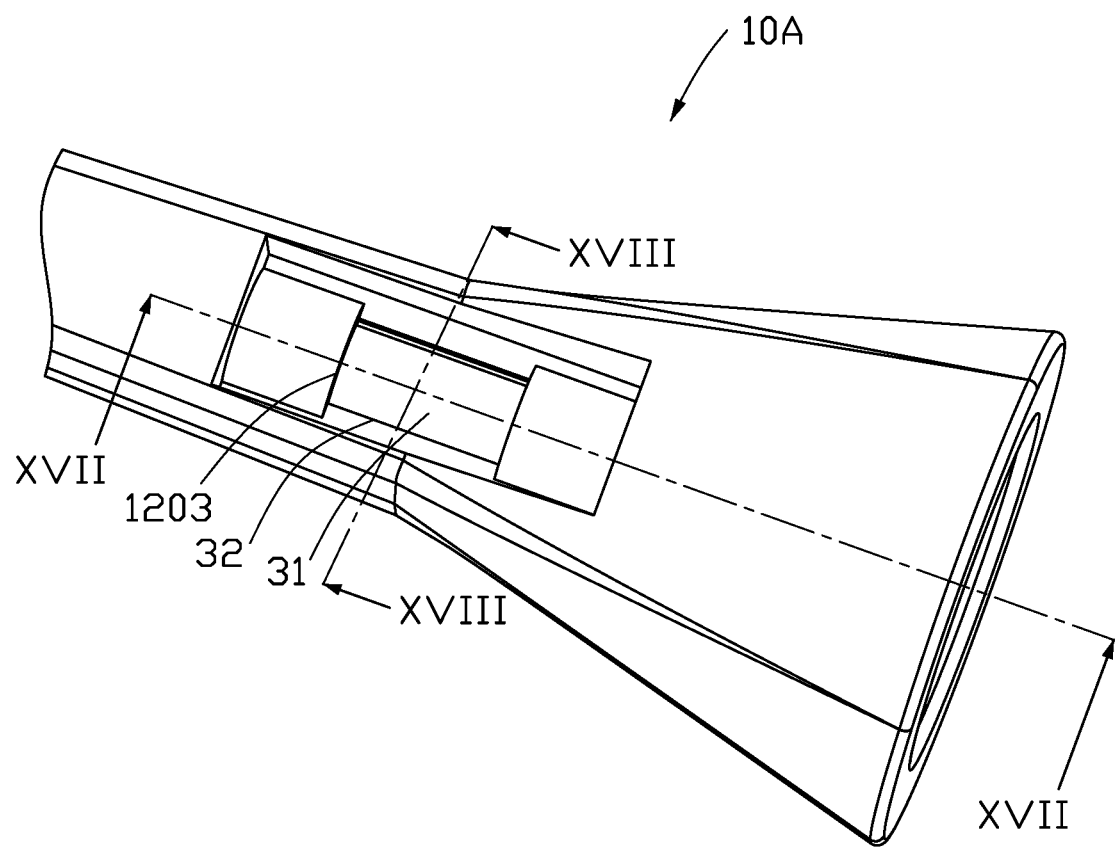
FIG. 16 is a partial view of a main body shown in FIG. 15.

With reference to FIG. 15 through FIG. 16, the structure of the brushhead 100A of the second embodiment is different from the structure of the brushhead 100 of the first embodiment, and will be described later.

The brushhead 100A comprises a main body 10A and an engaging assembly 20A, and the engaging assembly 20A is received in the main body 10A.

The engaging assembly 20A comprises an elastic member 40A and a cover 50A. The main body 10A defines a receiving cavity 31 configured to receive at least a portion of the vibrating driving shaft 250. The main body 10A comprises a cavity wall 32 substantially surrounding the receiving cavity 31 and an end 101 connected to the handle 200, with an opening 11 defined in the end 101 of the main body 10A being communicating with the receiving cavity 31, so that the vibrating driving shaft 250 is capable of being inserted into the receiving cavity 31 through the opening 11. The engaging assembly 20A is mounted in a side wall 105 of the main body 10A, and the engaging assembly 20A comprises an elastic member 40A, which is made by metal material. A recess 12 is defined in the outer surface 102 of the side wall 105, and the elastic member 40A is deformable and received in the recess 12. The elastic member 40A is elastically deformed by force of the vibrating drive shaft 250 when the brushhead 100A is attached to the handle 200 of the power toothbrush 300, so as to apply a force to the vibrating drive shaft in a direction which is perpendicular to the extending direction of the vibrating driving shaft 250. Of course, in other embodiments, the elastic member 40A may also be made of other materials, which is not limited herein.

In the present disclosure, the recess 12 is in air communication with the receiving cavity 31, and at least a part of the elastic member 40A extends into the receiving cavity 31 and directly contact the vibrating drive shaft 250. Further, the elastic member 40A directly contact the first metal portion 220 of the vibrating drive shaft 250. The first metal part 220 is provided with a pattern 221, and the elastic member 40A directly abuts on the pattern 221 to connect the vibrating drive shaft 250 with the brushhead 100A.

In the present disclosure, the recess 12 is integrally formed with the main body 10A, and the recess 12 is defined by a bottom 1201 and a wall 1202 extending from the bottom 1201. A hole 1203 is defined in the bottom 1201 of the recess 12 so as to communicating the recess 12 with the receiving cavity 31.

Figure 17:
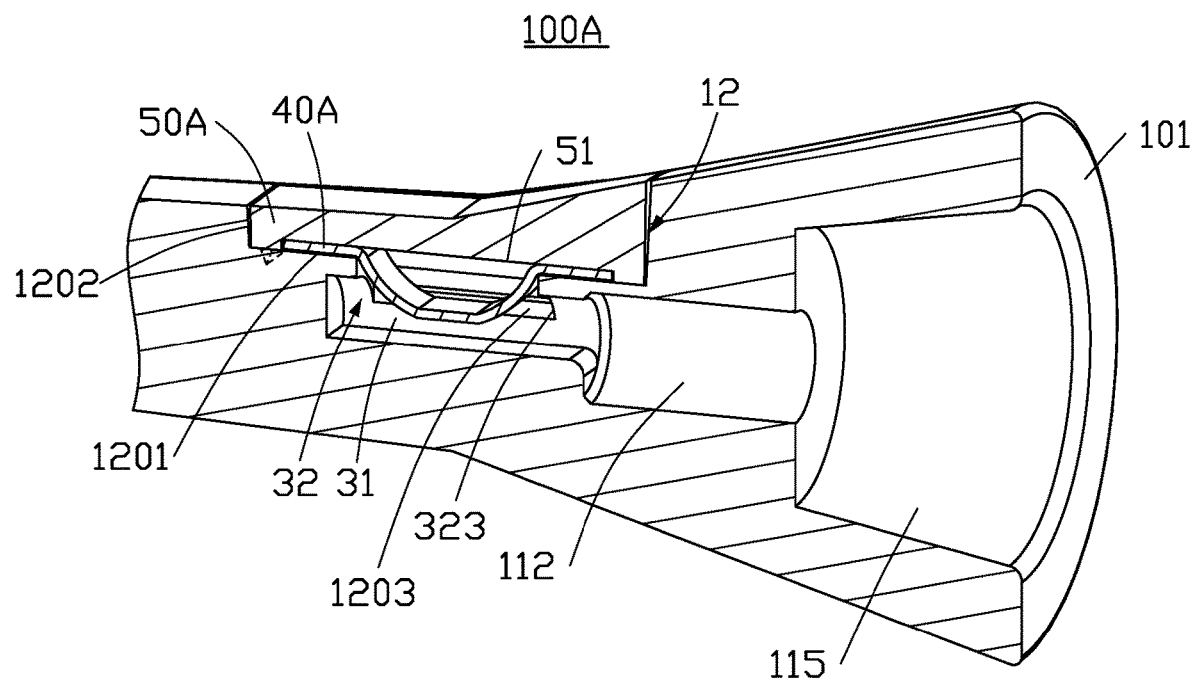
FIG. 17 is a cross-sectional view of the brushhead shown in FIG. 16 along a view line XVII-XVII, and is similarly viewed as in FIG. 6.
Figure 18:
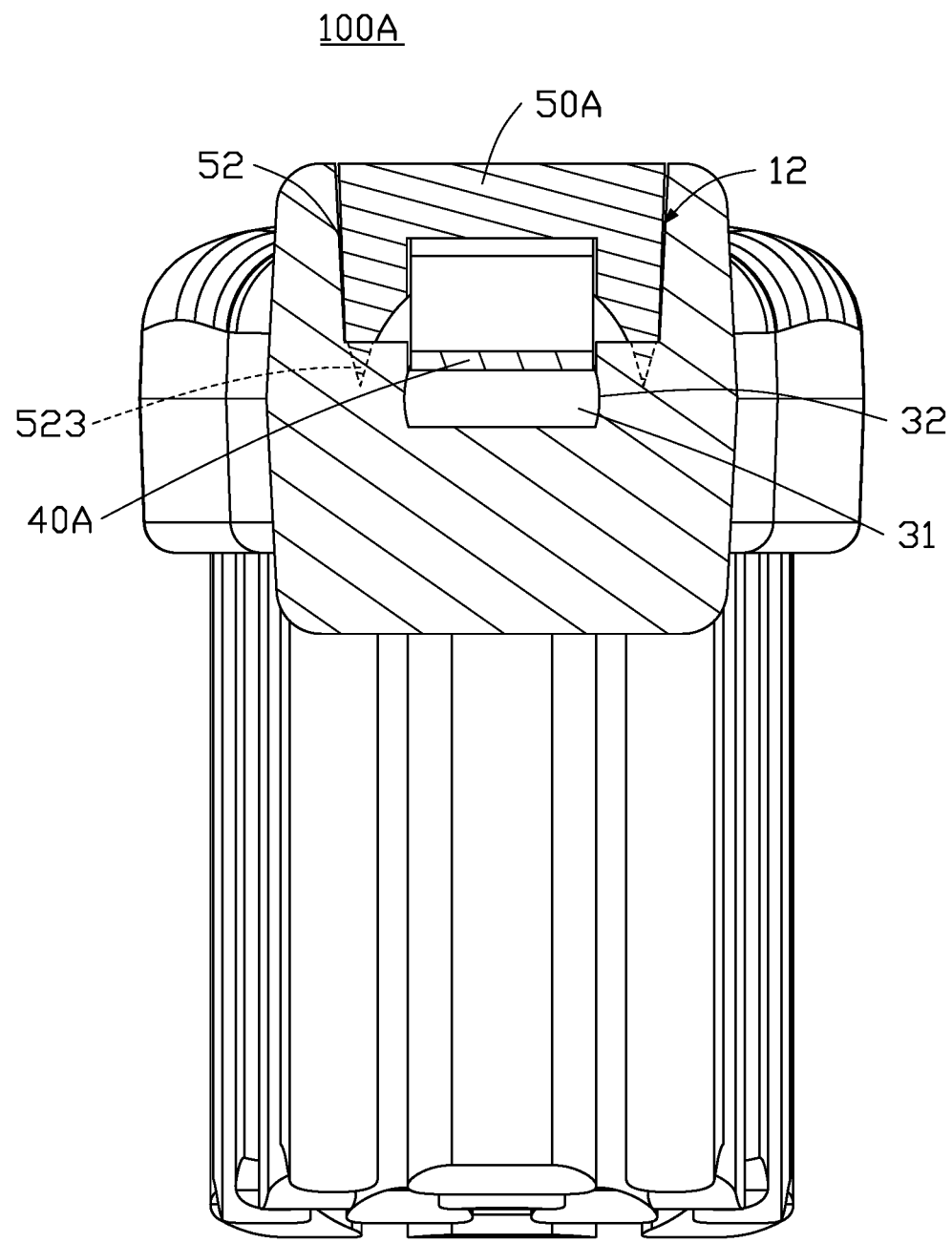
FIG. 18 is a cross-sectional view of the brushhead shown in FIG. 16 along a view line XVIII-XVIII, and is similarly viewed as in FIG. 8.
Figure 19:
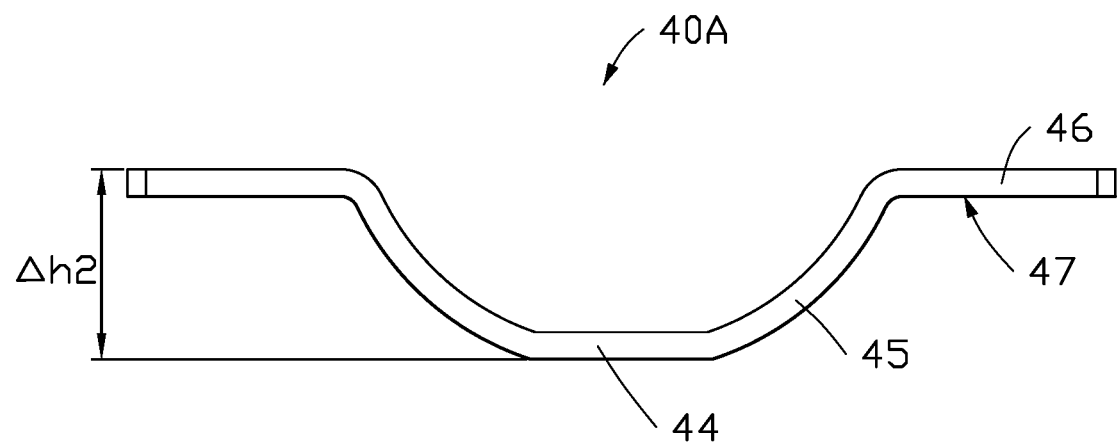
FIG. 19 is a front view of an elastic member shown in FIG. 15.

With reference to FIG. 17 through FIG. 19, the elastic member 40A comprises a contacting portion 44, at least one elastic portion 45 and at least one fastened portion 46. The contacting portion 44 is used for contacting the vibrating drive shaft 250. At least one elastic portion 45 is used for applying the force to the vibrating drive shaft 250 in a direction which is perpendicular to the extending direction of the vibrating driving shaft 250. At least one fastened portion 46 is used for fastening the elastic member in the recess 12. At least a portion of the contacting portion 44 is in a planar shape for contacting the vibrating driving shaft 250.

In the present disclosure, the elastic member 40A comprises a contacting portion 44, two elastic portion 45, and two fastened portion 46. The two elastic portion 45 are respectively located at two ends of the contacting portion 44. The two fastened portion 46 are located at two ends of the elastic portion 45, respectively. In the present disclosure, at least a portion of the contacting portion 44 is in a planar shape for contacting the vibrating driving shaft 250. Of course, in other embodiments, the contacting portion 44 may also be in an arc shape, which is not limited herein. The elastic member 40A is sandwiched between the bottom 1201 of the recess 12 and the cover 50A while the contacting portion 44 extending from the hole 1203.

It can be understood that by selecting such a shape, a sufficient resilience force is generated when the two elastic portion 45 are subjected to force by taking the two fastened portion 46 on both sides as a support point, thereby ensuring the engagement force, preventing the brushhead 100A from falling off in practical applications, and stably maintaining vibration, and low noise during vibration, strong durability and long service life.

Further, the vertical distance $\Delta h2$ between the second flat portion 46 and the contacting portion 44 of the elastic member 40A ranges from about 0.2 mm to 5.0 mm, for example, 1.5 mm, 2.1 mm, and 2.6 mm, etc.

The contacting portion 44 of the elastic member 40A directly abuts the pattern 221 on the first metal portion 220 of the vibrating drive shaft 250.

In one embodiment, the elastic member 40A comprises a metal body, and a thin film 47 is formed on the metal body, so as to prevent the elastic member 40A from directly contacting the vibrating drive shaft 250, thereby effectively preventing noise and other situations. Of course, the thin film 47 may also be omitted, and the thin film 47 may be formed only on the surface of the elastic member 40 which contacts the vibrating drive shaft 250, or may be formed on the entire surface of the elastic member 40, which is not limited herein. The material of the thin film 47 may be a material such as a wear-resistant plastic or rubber oil, which is not limited herein. The thin film 47 may be formed on the surface of the elastic member 40A by spraying or chemical vapor deposition, which is not limited herein.

In the present disclosure, the engaging assembly 20A further comprises a cover 50A which engages with the cavity wall 32 of the main body 10A and covers the recess 12. A receiving groove 51 is defined in an inner surface of the cover 50A, and the elastic member 40A is limited in the receiving groove 51.

The cover 50A is fixed in the recess 12 by a snap-fit structure or an ultrasonic welding technique. In the present disclosure, the cover 50A is fixed in the recess 12 by an ultrasonic welding technique. With reference to FIG. 15 and FIG. 18, the cover 50A comprises two first side walls 52 disposed opposite to each other extending along the longitudinal direction thereof. Before being fixed in the recess 12 by the ultrasonic welding technology, a connecting portion 522 is provided at one end of each first side wall 52 away from the outer surface of the cover 50A, and the connecting portion 522 has a thinner thickness than other areas, so that an ultrasonic line (not shown) is formed between the connecting portion 522 and other areas. After the cover 50A is fixed in the recess 12 by the ultrasonic welding technology, the connecting portion 522 and a part of the main body 10A are welded together to form a welding area 523, thereby firmly connecting the cover 50A and the main body 10A.

It can be understood that the connecting portion 522 is provided on the first sidewall 52 of the cover 50A. A connecting portion 522 is provided at one end of each first side wall 52 away from the outer surface of the cover 50A. The connecting portion 522 has a thinner thickness than other areas. In this way, the welding of the cover 50 and the main body 10A can be achieved easier and more efficient during the ultrasonic welding process, and providing sufficient space for welding with at least a part of the main body 10A. In addition, the cover 50A is fixed in the recess 12 by the ultrasonic welding technology, which is simple in structure and more stable in connectivity.

According to the present disclosure, since the elastic member 40A directly abuts the pattern 221 of the vibrating drive shaft 250, the elastic force of the elastic member 40A can concentrate and directly act on the pattern 221, the main body 10A and the handle 200 can be firmly connected, and vibration of the brushhead 100A by vibration of the handle 200 is achieved. The structure for connecting the main body 10A and the handle 200 is simple, and therefore, the structure of the brushhead 100A is simple and easy to manufacture, and the production cost is low.

In addition, the brushhead 100A of the present disclosure is directly attached to the handle 200 of the power toothbrush 300. In this way, only the connection between the brushhead 100A and the handle 200 needs to be considered during the assembly process, thereby effectively preventing any offset between the brushhead 100A and the handle 200, and further ensuring the stability of the power toothbrush 300 during use, and the appearance effect is good.

Other Embodiments

In the first embodiment, although the cover 50 is fixed in the recess 12 by the snap fit structure, the cover 50 may be fixed and welded by an ultrasonic welding technique. And although the elastic member 40 comprises the first curved portion 41, the second curved portion 42, and the flat portion 43 in the first embodiment, the elastic member 40A in the second embodiment may be employed.

In the second embodiment, although the elastic member 40A comprises the contacting portion 44, the elastic portion 45, and the fastened portion 46, the elastic member 40 in the first embodiment may be employed.

Even though information and advantages of the present exemplary embodiments have been set forth in the foregoing description, together with details of the structures and functions of the present exemplary embodiments, the disclosure is only for illustrative purposes. Changes may be made in detail, especially in matters of shape, size, and arrangement of parts within the principles of the present exemplary embodiments to the full extent indicated by the plain meaning of the terms in which the appended claims are expressed.

An embodiment of the present disclosure has the following features:

(1) A brushhead for an power toothbrush detachably attached to a handle of the power toothbrush, the handle including a vibrating drive shaft, the brushhead comprising:
a main body defining a receiving cavity which is configured to receive at least a portion of the vibrating driving shaft, the main body including a cavity wall substantially surrounding the receiving cavity and an end connected to the handle, with an opening which is defined in the end of the main body in air communication with the receiving cavity, so that the vibrating driving shaft is capable of being inserted into the receiving cavity through the opening; and
an engaging assembly mounted in a side wall of the main body, the engaging assembly comprising an elastic member, which is made by metal material;
wherein, a recess is defined in the outer surface of the side wall, the elastic member is deformably received in the recess,
the elastic member is elastically deformed by force provided from the vibrating drive shaft when the brushhead is attached to the handle of the power toothbrush.

(2) In the brushhead for the power toothbrush according to (1), the recess is in air communication with the receiving cavity, at least a part of the elastic member extends into the receiving cavity and directly contact the vibrating drive shaft.

(3) In the brushhead for the power toothbrush according to (1), The elastic member comprises a metal body, and a thin film is formed on the metal body.

(4) In the brushhead for the power toothbrush according to (1), the elastic member comprises a contacting portion for contacting the vibrating drive shaft, at least one elastic portion for applying a force to the vibrating drive shaft in a direction which is perpendicular to the extending direction of the vibrating driving shaft.

(5) In the brushhead for the power toothbrush according to (4), at least a portion of the contacting portion is in a planar shape for contacting the vibrating driving shaft.

(6) In the brushhead for the power toothbrush according to (4), the vertical distance between the flat portion and the contacting portion of the elastic member is in a range of 0.2 mm to 5.0 mm.

(7) In the brushhead for the power toothbrush according to (1), the engaging assembly further comprises a cover which engages with the cavity wall of the main body and covers the recess.

(8) In the brushhead for the power toothbrush according to (7), a receiving groove is defined in an inner surface of the cover, and the elastic member is limited in the receiving groove.

(9) In the brushhead for the power toothbrush according to (7), the cover is mounted to the main body by a snap-fit structure.

(10) In the brushhead for the power toothbrush according to (7), the cover is mounted to the main body by ultrasonic welding.

(11) In the brushhead for the power toothbrush according to (7), the recess is integrally formed with the main body, and the recess is defined by a bottom and a wall extending from the bottom, a hole is defined in the bottom of the recess for communicating the recess and the receiving cavity.

(12) In the brushhead for the power toothbrush according to (11), the elastic member is sandwiched between the bottom of the recess and the cover while the contacting portion extending from the hole.

(13) In the brushhead for the power toothbrush according to (1), the elastic member is made by metal material.

What is claimed is:

1. A brushhead configured for a power toothbrush detachably attached to a handle of the power toothbrush, the handle including a vibrating drive shaft, the brushhead comprising:
a main body comprising a receiving cavity configured to receive at least a portion of the vibrating driving shaft a cavity wall substantially surrounding the receiving cavity, an end of the main body being configured to be connected to the handle, and a first opening in the end of the main body in air communication with the receiving cavity, so that the vibrating driving shaft is-insertable into the receiving cavity through the first opening, and an interior wall disposed in a space between a center axis and an outer surface of the main body; and
an engaging assembly mounted at a side wall of the main body, the engaging assembly comprising an elastic member; the elastic member comprising at least one fastened portion and a contacting portion spaced from and offset from the fastened portion, the fastened portion engaged on the interior wall, the contacting portion configured for facing towards an end of the driving shaft and receiving vibrations from the vibrating drive shaft when the brushhead is attached to the handle of the power toothbrush,
wherein a recess is defined in the space between the center axis and the outer surface of the main body, and the elastic member is received in the recess, the main body further comprises a cover engaged with a surrounding wall of the recess and covering the recess, the fastened portion is engaged on a bottom surface of the recess, the elastic member is sandwiched between the bottom surface of the recess and the cover.

2. The brushhead according to claim 1, wherein in the assembled state, the contacting portion abuts on at least part of the vibrating driving shaft away from a housing of the handle.

3. The brushhead according to claim 1, wherein the at least one fastened portion comprises a first and a second fastened portions, the first and the second fastened portions extend along a direction that the main body receives the vibrating driving shaft.

4. The brushhead according to claim 1, wherein the recess is in air communication with the receiving cavity, and the contacting portion extends into the receiving cavity and directly contacts the vibrating drive shaft.

5. The brushhead according to claim 1, wherein the recess comprises a second opening on an outer surface of the side wall.

6. The brushhead according to claim 1, wherein the interior wall is formed in the cover.

7. The brushhead according to claim 6, wherein a receiving groove is formed in the cover, and the elastic member is in the receiving groove.

8. The brushhead according to claim 1, wherein the elastic member comprises a two-layered structure of a metal body and a thin film on the metal body.

9. The brushhead according to claim 1, wherein a vertical distance between the fastened portion and the contacting portion of the elastic member is in a range of 0.2 mm to 5.0 mm.

10. The brushhead according to claim 1, wherein the elastic member is metallic.

11. A brushhead configured for a power toothbrush detachably attached to a handle of the power toothbrush, the handle including a metal shaft, the brushhead comprising:
a main body defining a receiving cavity configured to receive at least a portion of the vibrating driving shaft, the main body comprising a cavity wall substantially surrounding the receiving cavity; an end of the main body being configured to be connected to the handle; and an opening in the end of the main body and in air communication with the receiving cavity, so that the vibrating driving shaft is insertable into the receiving cavity through the opening; and
an engaging assembly mounted in a side wall of the main body, the engaging assembly comprising an elastic member configured for facing towards the end of the driving shaft and receiving vibrations from the vibrating drive shaft when the brushhead is attached to the handle of the power toothbrush;
wherein a recess is defined in the side wall of the main body and receives the elastic member, the recess is integrally formed with the main body, and defined by a bottom and a side portion extending from the bottom, and a hole is defined in the bottom of the recess, the hole communicates with each of the recess and the receiving cavity.

* * * * *